United States Patent
Kataoka et al.

(10) Patent No.: US 11,099,324 B2
(45) Date of Patent: Aug. 24, 2021

(54) OPTICAL WAVEGUIDE DEVICE

(71) Applicant: SUMITOMO OSAKA CEMENT CO., LTD., Tokyo (JP)

(72) Inventors: Yu Kataoka, Tokyo (JP); Norikazu Miyazaki, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/667,888

(22) Filed: Oct. 29, 2019

(65) Prior Publication Data

US 2020/0292757 A1 Sep. 17, 2020

(30) Foreign Application Priority Data

Mar. 13, 2019 (JP) .............................. JP2019-046148

(51) Int. Cl.
*G02B 6/125* (2006.01)
(52) U.S. Cl.
CPC .................................. *G02B 6/125* (2013.01)
(58) Field of Classification Search
CPC .......... G02B 6/10; G02B 6/122; G02B 6/125; G02B 6/262
USPC .................. 385/1–3, 14, 31, 32, 50
See application file for complete search history.

(56) References Cited

U.S. PATENT DOCUMENTS

| | | | | |
|---|---|---|---|---|
| 4,983,006 A * | 1/1991 | Nishimoto | ............ | G02F 1/3132 385/16 |
| 5,018,814 A * | 5/1991 | Jannson | ................ | G02B 6/2821 385/28 |
| 5,243,672 A * | 9/1993 | Dragone | ............ | G02B 6/12011 385/17 |
| 5,461,684 A * | 10/1995 | Vinchant | ............. | G02B 6/2804 385/22 |
| 5,524,165 A * | 6/1996 | Labeye | .................. | G02B 6/125 385/129 |
| 8,837,879 B2 * | 9/2014 | Jeong | ..................... | G02B 6/125 385/32 |

(Continued)

FOREIGN PATENT DOCUMENTS

| | | | | |
|---|---|---|---|---|
| JP | 11-167032 A | * | 6/1999 | ............. G02B 6/122 |
| JP | 2015-096886 | * | 5/2015 | ............. G02B 6/122 |

(Continued)

*Primary Examiner* — Robert Tavlykaev
(74) *Attorney, Agent, or Firm* — JCIPRNET

(57) ABSTRACT

In the optical waveguide device including an unnecessary-light waveguide for guiding unnecessary light emitted from a main waveguide, an emission waveguide connected to the unnecessary-light waveguide to emit the unnecessary light propagating through the unnecessary-light waveguide to the outside of the substrate is formed; an effective refractive index of the emission waveguide is set to be higher than an effective refractive index of the unnecessary-light waveguide; in a connection portion between the unnecessary-light waveguide and the emission waveguide, a centerline of the emission waveguide is inclined in a direction away from the main waveguide with respect to a centerline of the unnecessary-light waveguide; furthermore, in the connection portion, a position of the centerline of the emission waveguide is disposed to be shifted to a position further away from the main waveguide with respect to a position of the centerline of the unnecessary-light waveguide.

5 Claims, 5 Drawing Sheets

(56) References Cited

U.S. PATENT DOCUMENTS

| | | | | |
|---|---|---|---|---|
| 2002/0122630 | A1* | 9/2002 | Bona | G02B 6/12007 385/43 |
| 2011/0194802 | A1* | 8/2011 | Sugiyama | G02F 1/0356 385/3 |
| 2017/0153393 | A1* | 6/2017 | Ma | G02B 6/1228 |
| 2018/0259709 | A1* | 9/2018 | Yoshioka | G06F 3/042 |
| 2020/0064706 | A1* | 2/2020 | Villa | G02F 1/011 |

FOREIGN PATENT DOCUMENTS

| | | | | |
|---|---|---|---|---|
| JP | 2015096886 | | 5/2015 | |
| JP | 2016-048358 A | * | 4/2016 | G02B 6/122 |

* cited by examiner

OPTICAL WAVEGUIDE DEVICE

CROSS-REFERENCE TO RELATED APPLICATION

This application claims the priority benefit of Japan Patent Application No. 2019-046148, filed on Mar. 13, 2019. The entirety of the above-mentioned patent application is hereby incorporated by reference herein and made a part of this specification.

BACKGROUND OF THE INVENTION

Technical Field

The disclosure relates to an optical waveguide device, in particular, to an optical waveguide device in which an optical waveguide is formed on a substrate and the optical waveguide includes a main waveguide for guiding signal light and an unnecessary-light waveguide for guiding unnecessary light emitted from the main waveguide.

Related Art

In an optical communication field or an optical measurement field, an optical waveguide device such as an optical modulator in which an optical waveguide is formed on a substrate is widely used. As a method of forming the optical waveguide, a method of forming the optical waveguide by thermally diffusing a metal such as Ti on a substrate made of quartz, lithium niobate, a semiconductor material or the like, a method of forming the optical waveguide by forming a ridge type projection portion, and the like are known.

The optical waveguide includes a branch portion and a junction portion like a Mach-Zehnder type optical waveguide. In addition, recently, in response to multi-level modulation, polarization synthesis, and the like, an optical waveguide device is also put into practical use in which a plurality of Mach-Zehnder type optical waveguides are arranged on one substrate as in, for example, a nest type waveguide in which a plurality of Mach-Zehnder type optical waveguides are combined in a nest shape.

When the optical waveguide is branched, in order to obtain an appropriate branching ratio and to suppress leakage light from the branch portion, it is proposed to dispose, in an optical waveguide in a previous stage of a branch portion in FIG. 1, an unnecessary-light waveguide a for removing higher-order mode light propagating through the optical waveguide.

Further, it is also proposed to dispose an unnecessary-light waveguide b in a junction portion as illustrated in FIG. 1 in order to effectively remove radiation mode light emitted from the junction portion when the optical waveguides are joined.

When a plurality of Mach-Zehnder type optical waveguides are incorporated into one substrate as described above, the unnecessary light emitted from a part of the optical waveguide is coupled to other parts of the optical waveguide as in a dotted line region A or B in FIG. 1, leading to degradation of optical characteristics. Additionally, in the Mach-Zehnder type optical modulator, it also leads to degradation of optical characteristics such as an ON/OFF extinction ratio. Furthermore, in patent literature 1 (Japanese Patent Laid-Open No. 2015-096886), a configuration example in which the unnecessary-light waveguide is divided across a main waveguide is illustrated; however, there is a case that the main waveguide is disposed along an extension line of the unnecessary-light waveguide in a highly integrated optical waveguide device. In this case, there is a higher risk of mixing unnecessary light.

Moreover, in a case that a thickness of a substrate is small, for example, in a case that the substrate has a thickness of 20 μm or less, unnecessary light is easily confined in the substrate, and compared with a case that the substrate has a sufficient thickness such as a thickness of 500 μm or more, a ratio of being recoupled with the main waveguide is extremely high.

There is also a case that a light-absorbing member such as a metal film is disposed in an unnecessary-light waveguide to absorb the unnecessary light. However, it is difficult to exhibit a sufficient light-absorbing action because a place to displace the light-absorbing member such as a metal film is limited, and because a material that can be used as a light-absorbing material is also limited in terms of a manufacturing process of the optical waveguide device, and the like.

Therefore, in patent literature 1 (Japanese Patent Laid-Open No. 2015-096886), it is proposed that an unnecessary-light collection waveguide c for collecting unnecessary light is arranged, as illustrated in FIG. 1, along a lateral end portion in a longitudinal direction of a substrate to efficiently remove the unnecessary light by the unnecessary-light waveguide.

In addition, when the unnecessary-light waveguides a and b are connected to the unnecessary-light collection waveguide, a length of the substrate in the longitudinal direction can be reduced and a size of the optical waveguide device can be reduced by increasing bending of the unnecessary-light waveguides a and b. However, as illustrated in FIGS. 2 and 3, when an optical waveguide is bent sharply, the amount of leakage light also increases, making it difficult to efficiently collect the unnecessary light in the unnecessary light collection waveguide. Moreover, FIG. 2 is a diagram illustrating a shape of the optical waveguide used in simulation and FIG. 3 is a diagram illustrating a result of the simulation.

The disclosure provides an optical waveguide device which can efficiently emit unnecessary light guided by an unnecessary-light waveguide to the outside of a substrate and can reduce the size of the optical waveguide device.

SUMMARY

The optical waveguide device according to the disclosure has the following technical features.

In the optical waveguide device, an optical waveguide is formed on a substrate and the optical waveguide includes a main waveguide for guiding signal light and an unnecessary-light waveguide for guiding unnecessary light emitted from the main waveguide; an emission waveguide connected to the unnecessary-light waveguide to emit the unnecessary light propagating through the unnecessary-light waveguide to the outside of the substrate is formed; an effective refractive index of the emission waveguide is set to be higher than an effective refractive index of the unnecessary-light waveguide; in a connection portion between the unnecessary-light waveguide and the emission waveguide, a centerline of the emission waveguide is inclined in a direction further away from the main waveguide with respect to a centerline of the unnecessary-light waveguide; and furthermore, in the connection portion, a position of the centerline of the emission waveguide is disposed to be shifted to a position further away from the main waveguide with respect to a position of the centerline of the unnecessary-light waveguide.

DESCRIPTION OF THE EMBODIMENTS

In the optical waveguide device described above, the effective refractive index is set to be higher by setting a width of the emission waveguide to be wider than a width of the unnecessary-light waveguide.

In the optical waveguide device described above, in an end portion on a side of the emission waveguide to which the unnecessary-light waveguide is connected, there is a transition region in which the width of the waveguide changes.

In the optical waveguide device described above, with respect to a propagation direction of light wave of the main waveguide, a branch portion or a junction portion of the main waveguide is disposed behind a position where the emission waveguide is disposed.

In the optical waveguide device described above, a thickness of the substrate is 20 μm or less.

According to the disclosure, in the optical waveguide device, an optical waveguide is formed on a substrate and the optical waveguide includes a main waveguide for guiding signal light and an unnecessary-light waveguide for guiding unnecessary light emitted from the main waveguide; an emission waveguide connected to the unnecessary-light waveguide to emit the unnecessary light propagating through the unnecessary-light waveguide to the outside of the substrate is formed; an effective refractive index of the emission waveguide is set to be higher than an effective refractive index of the unnecessary-light waveguide; in a connection portion between the unnecessary-light waveguide and the emission waveguide, a centerline of the emission waveguide is inclined in a direction further away from the main waveguide with respect to a centerline of the unnecessary-light waveguide; and furthermore, in the connection portion, a position of the centerline of the emission waveguide is disposed to be shifted to a position further away from the main waveguide with respect to a position of the centerline of the unnecessary-light waveguide. Therefore, compared with a case that an optical path is bent only by the unnecessary-light waveguide, leakage light from the optical waveguide can be suppressed and the optical path can be bent to a greater extent. Thereby, it is possible to realize the optical waveguide device which can efficiently emit the unnecessary light guided by the unnecessary-light waveguide to the outside of the substrate and which can reduce the size of the optical waveguide device.

Figure 4:
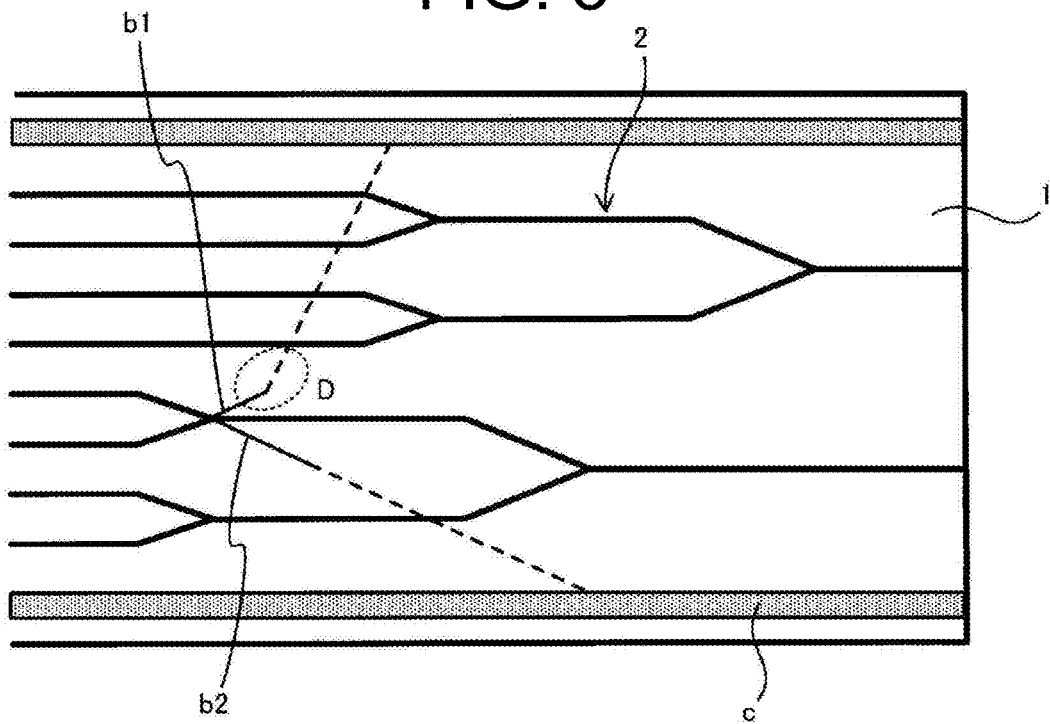
FIG. 4 is a diagram illustrating an example of an optical waveguide device according to the disclosure.
Figure 5:
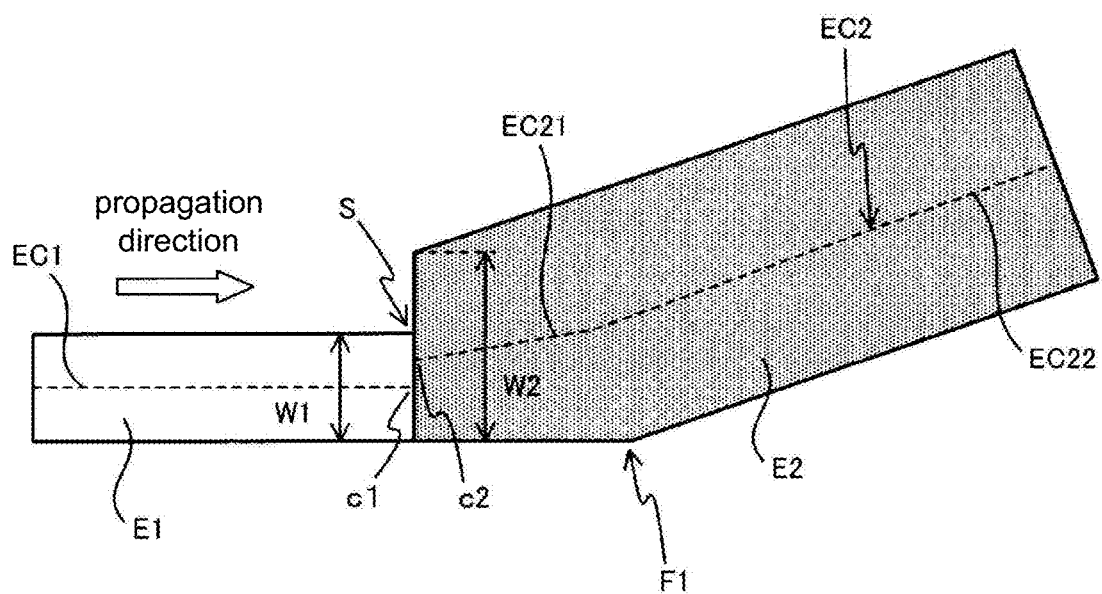
FIG. 5 is a diagram illustrating a shape of an optical waveguide in a dotted line frame D in FIG. 4.

Hereinafter, the disclosure is described in detail using preferred examples. As illustrated in FIGS. 4 and 5, in an optical waveguide device according to the disclosure, an optical waveguide 2 is formed on a substrate 1 and the optical waveguide includes a main waveguide for guiding signal light and an unnecessary-light waveguide (shown as the unnecessary-light waveguide b1 and b2 of FIG. 4 and the unnecessary-light waveguide E1 of FIG. 5) for guiding the unnecessary light emitted from the main waveguide; an emission waveguide E2 connected to the unnecessary-light waveguide E1 to emit the unnecessary light propagating through the unnecessary-light waveguide to the outside of a substrate is formed; an effective refractive index of the emission waveguide is set to be higher than an effective refractive index of the unnecessary-light waveguide; in a connection portion S between the unnecessary-light waveguide and the emission waveguide, a centerline EC21 of the emission waveguide E2 is inclined in a direction (upward direction in FIG. 5) further away from the main waveguide with respect to a centerline EC1 of the unnecessary-light waveguide E1; and furthermore, in the connection portion, a position c2 of the centerline of the emission waveguide is disposed to be shifted to a position (upper side in FIG. 5) further away from the main waveguide with respect to a position c1 of the centerline of the unnecessary-light waveguide. Moreover, FIG. 5 is a diagram illustrating an example of the optical waveguide in a dotted line frame D in FIG. 4.

The substrate configuring the optical waveguide device according to the disclosure is not particularly limited as long as the substrate is made of a material capable of forming the optical waveguide on the substrate, such as quartz, lithium niobate, a semiconductor material, and the like. When a light wave propagating through the optical waveguide is modulated by electric field formed by an electrode of an optical modulator or the like, it is preferable to use a substrate having an electro-optic effect such as a lithium niobate substrate, a lithium tantalite substrate or the like. In addition, when a substrate as thin as 20 μm or less is used, it is usually easy to guide the unnecessary light in the substrate. In contrast, by applying the disclosure, it is possible to not only increase bending of the optical waveguide in the unnecessary-light waveguide and the emission waveguide, but also suppress leakage light from the optical waveguide, and the amount of unnecessary light propagating through the substrate can be effectively suppressed.

As a method of forming the optical waveguide, a method of thermally diffusing a metal such as Ti into the substrate and forming a portion having a higher refractive index than the substrate material, a method of forming irregularities on a substrate surface and configuring a ridge type waveguide, and the like can be applied.

Figure 1:
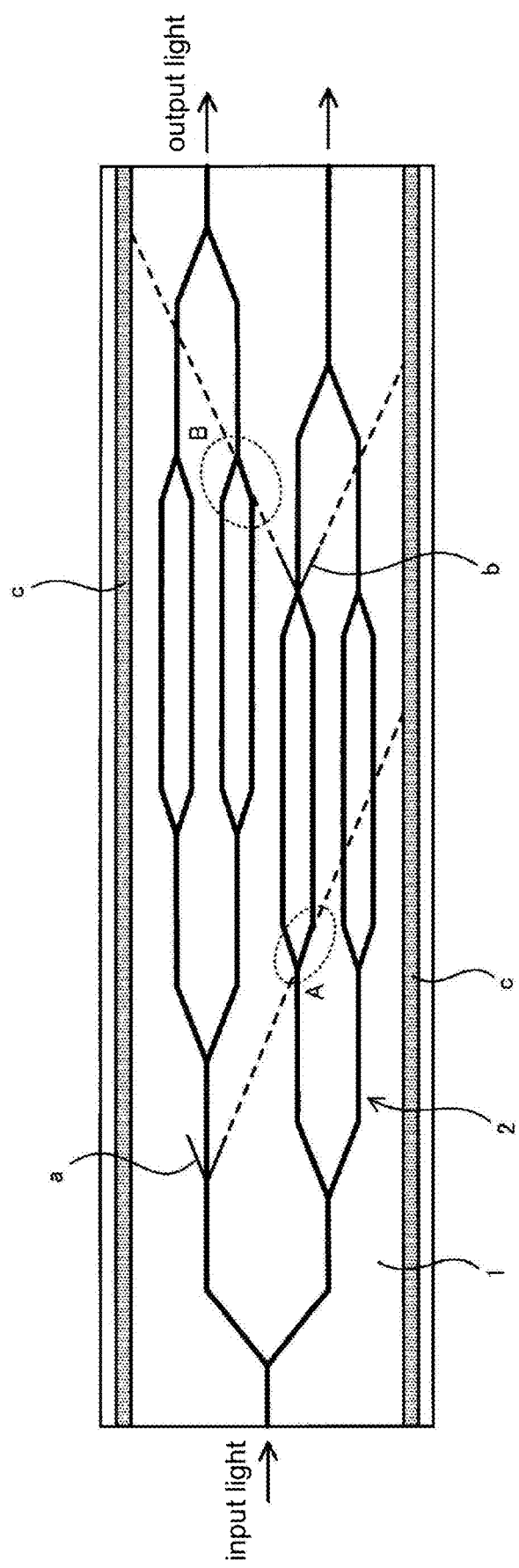
FIG. 1 is a diagram illustrating an example of a conventional optical waveguide device.
Figure 2:
FIG. 2 is a diagram illustrating a simulation model for investigating leakage light caused by bending in a conventional optical waveguide.

The unnecessary-light waveguide of the optical waveguide device according to the disclosure includes not only the optical waveguides b1 and b2 as illustrated in FIG. 4 which guides radiation mode light generated in a junction portion of the optical waveguide but also the unnecessary-light waveguide a as illustrated in FIG. 1 which is arranged for removing higher-order mode light from the optical waveguide.

In the optical waveguide device according to the disclosure, as illustrated in FIG. 5, by setting a width W2 of the emission waveguide E2 to be wider than a width W1 of the unnecessary-light waveguide E1, the effective refractive index can be easily set higher.

In addition, in the optical waveguide device according to the disclosure, preferably, as illustrated in FIG. 5, in an end portion (a range from a connection portion S to a position of a reference numeral F1) on a side to which the unnecessary-light waveguide of the emission waveguide E2 is connected, there is a transition region in which the width of the waveguide changes. Due to the existence of the transition region, the light wave can smoothly propagate through the optical waveguide, and the light wave leaking out of the optical waveguide can also be suppressed.

In addition, as illustrated in FIG. 5, a lower side (a lateral side located on an outer side of a bending portion of the main optical waveguide) of the unnecessary-light waveguide E1 and a lower side of the emission waveguide E2 are formed into a straight line through the connection portion S. The arrangement of the connection portion exhibits an effect of suppressing the leakage light leaking in an outward direction of the bending portion of the optical waveguide.

Figure 3:
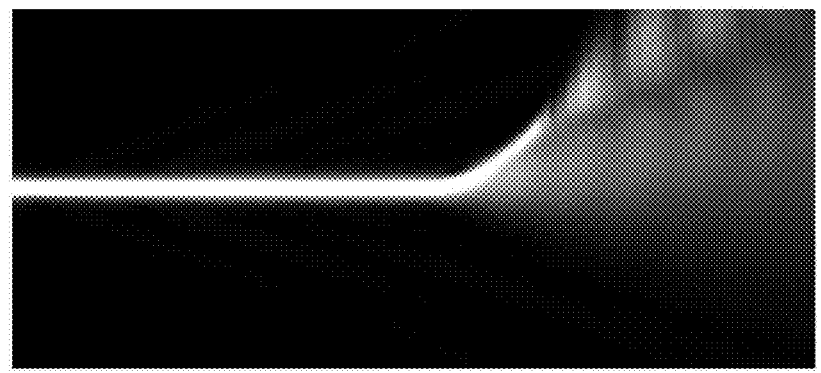
FIG. 3 is a diagram illustrating a simulation result obtained by the model in FIG. 2.
Figure 6:
FIG. 6 is a diagram illustrating a simulation model for investigating leakage caused by bending of the optical waveguide according to the disclosure.
Figure 7:
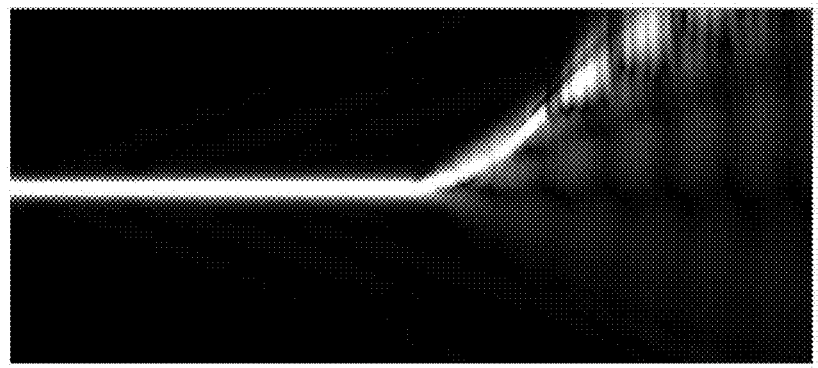
FIG. 7 is a diagram illustrating a simulation result obtained by the model in FIG. 6.

FIG. 6 is a diagram illustrating a shape of the optical waveguide as a model to simulate a generation state of the leakage light in the shape of the optical waveguide in FIG. 5. Besides, FIG. 7 is a result illustrating the generation state of the leakage light in the model of the optical waveguide in FIG. 6. By comparing FIG. 3 with FIG. 6, it is easily understood that the shape of the optical waveguide applied to the disclosure further suppresses generation of the leakage light.

In the optical waveguide device according to the disclosure, since the bending portion of the optical waveguide relating to the unnecessary light can be enlarged, as illustrated in FIG. 4, with respect to a propagation direction of the light wave of the main waveguide, a branch portion (not illustrated) or a junction portion of the main waveguide can be disposed behind a position where the emission waveguide is disposed. In this case, as illustrated in FIG. 1, the optical waveguide relating to the unnecessary light can be prevented from overlapping or approaching other branch portions or junction portions.

Figure 8:
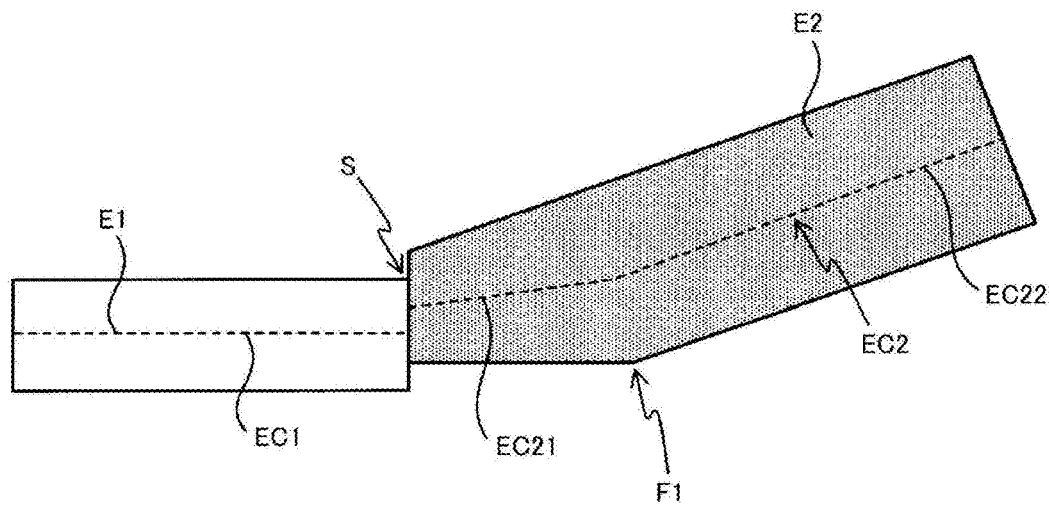
FIG. 8 is a diagram illustrating another shape (first shape) of the optical waveguide according to the optical waveguide device of the disclosure.

FIGS. 8 to 11 are diagrams illustrating various shapes of the optical waveguide applicable to the optical waveguide device according to the disclosure. In FIG. 8, the unnecessary-light waveguide E1 and the emission waveguide E2 in FIG. 5 are relatively shifted in a direction intersecting with an optical axis. In this way, the emission waveguide E2 can be brought closer to a lateral portion of the substrate in a longitudinal direction and the length of the optical waveguides can be further shortened.

Figure 9:
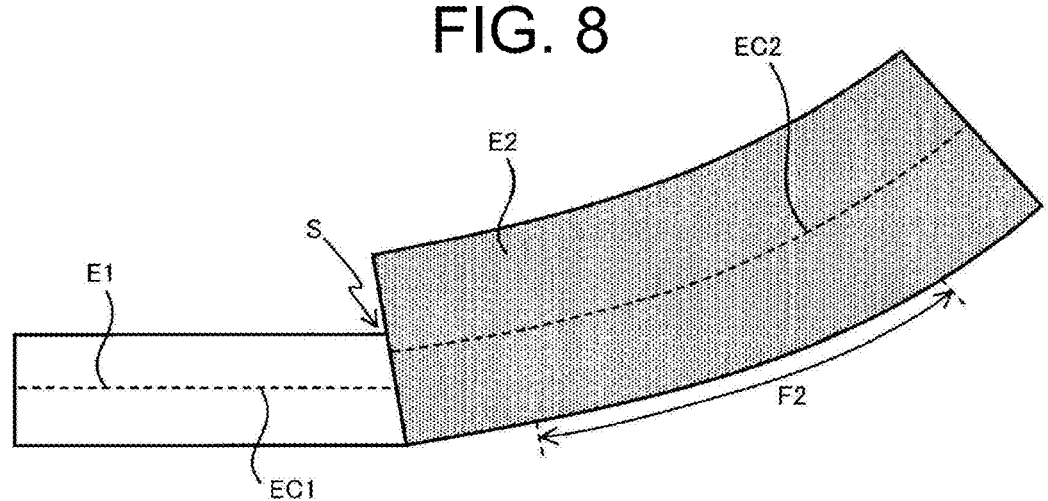
FIG. 9 is a diagram illustrating still another shape (second shape) of the optical waveguide according to the optical waveguide device of the disclosure.

FIG. 9 is a diagram in which a shape of the emission waveguide E2 is changed from linear bending F1 in FIG. 5 to a curved bending F2. Since the emission waveguide E2 has a width greater than the width of the unnecessary-light waveguide E1 and has a higher effective refractive index, a curvature radius of the bending can be further reduced.

Figure 10:
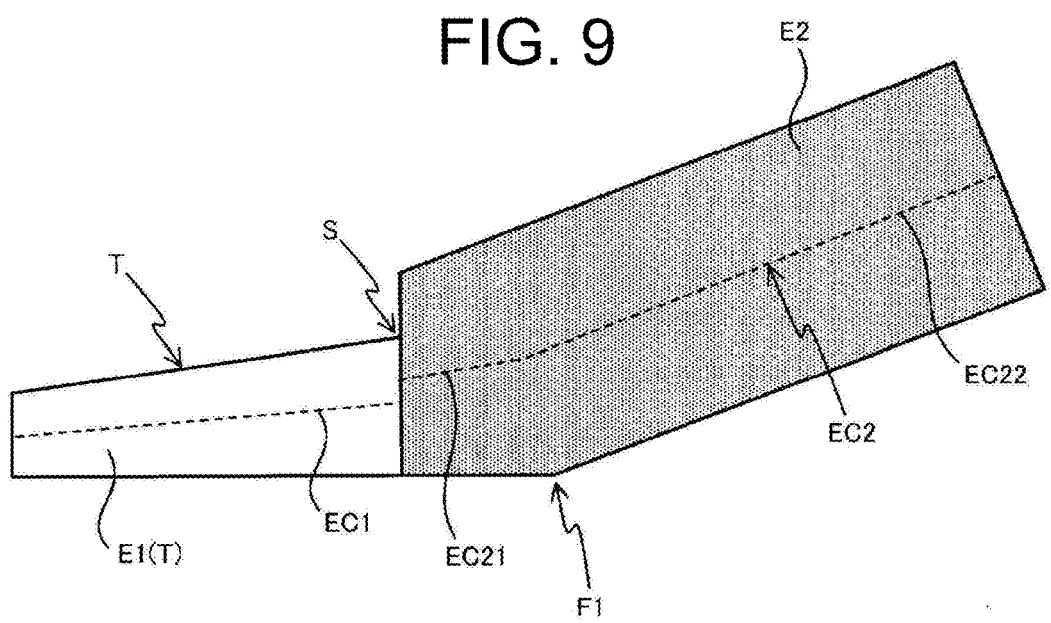
FIG. 10 is a diagram illustrating still another shape (third shape) of the optical waveguide according to the optical waveguide device of the disclosure.

FIG. 10 is a diagram in which a tapered shape T is arranged in the unnecessary-light waveguide E1 connected to the emission waveguide E2 and a transition region is added. By also arranging a transition region in the unnecessary-light waveguide, the light wave can be propagated more smoothly.

Figure 11:
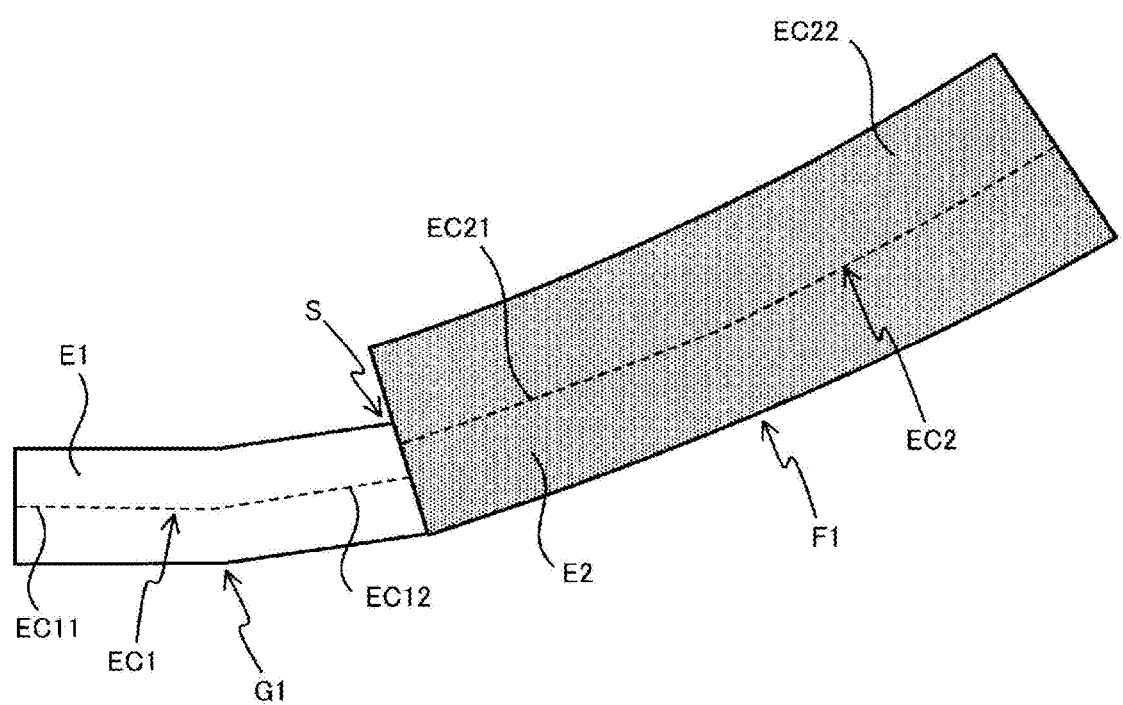
FIG. 11 is a diagram illustrating still another shape (fourth shape) of the optical waveguide according to the optical waveguide device of the disclosure.

FIG. 11 is a diagram in which a bending portion G1 is also arranged in the unnecessary-light waveguide E1. Since the width of the unnecessary-light waveguide is narrower than the width of the emission waveguide, it is impossible to bend the unnecessary-light waveguide as much as the emission waveguide, but the entire length of the optical waveguide relating to the unnecessary light can be reduced by increasing the number of bending portions.

As described above, according to the optical waveguide device of the disclosure, it is possible to provide an optical waveguide device which can efficiently emit unnecessary light guided by an unnecessary-light waveguide to the outside of a substrate and which can reduce a size of the optical waveguide device.

What is claimed is:

1. An optical waveguide device in which an optical waveguide is formed on a substrate and the optical waveguide comprises a main waveguide for guiding signal light and an unnecessary-light waveguide for guiding unnecessary light emitted from the main waveguide, wherein
an emission waveguide connected to the unnecessary-light waveguide to emit the unnecessary light propagating through the unnecessary-light waveguide to the outside of the substrate is formed,
an effective refractive index of the emission waveguide is set to be higher than an effective refractive index of the unnecessary-light waveguide,
in a connection portion between the unnecessary-light waveguide and the emission waveguide, a centerline of the emission waveguide is inclined in a direction further away from the main waveguide with respect to a centerline of the unnecessary-light waveguide,
furthermore, in the connection portion, a position of the centerline of the emission waveguide is disposed to be shifted to a position further away from the main waveguide with respect to a position of the centerline of the unnecessary-light waveguide, and
another optical waveguide different from the optical waveguide having the emission waveguide is provided on the substrate, and a propagating path of the unnecessary light emitted from the emission waveguide crosses a portion of the another optical waveguide that is parallel to the main waveguide, wherein the unnecessary light, once emitted from the emission waveguide, is not recaptured by a waveguide parallel to the path of the unnecessary light.

2. The optical waveguide device according to claim 1, wherein the effective refractive index is set to be higher by setting a width of the emission waveguide to be wider than a width of the unnecessary-light waveguide.

3. The optical waveguide device according to claim 2, wherein, in an end portion on a side of the emission waveguide to which the unnecessary-light waveguide is connected, there is a transition region in which the width of the waveguide changes.

4. The optical waveguide device according to claim 1, wherein, with respect to a propagation direction of light wave of the main waveguide, a branch portion or a junction portion of the main waveguide is disposed behind a position where the emission waveguide is disposed.

5. The optical waveguide device according to claim 1, wherein a thickness of the substrate is 20 μm or less.

* * * * *